(12) United States Patent
Wagner et al.

(10) Patent No.: US 9,039,061 B2
(45) Date of Patent: May 26, 2015

(54) VEHICLE FRAME ASSEMBLIES WITH THREADED CONNECTIONS

(71) Applicant: Ford Global Technologies, LLC, Dearborn, MI (US)

(72) Inventors: David Anthony Wagner, Northville, MI (US); Michael M. Azzouz, Livonia, MI (US); Eric William Barrett, Milford, MI (US); Xiaoming Chen, Canton, MI (US); John Martin Knittel, Canton, MI (US); Sanjay Mehta, Plymouth, MI (US); John Joseph Uicker, Dearborn, MI (US); Jeff A. Wallace, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 13/750,006

(22) Filed: Jan. 25, 2013

(65) Prior Publication Data

US 2013/0264842 A1    Oct. 10, 2013

Related U.S. Application Data

(63) Continuation-in-part of application No. 13/221,142, filed on Aug. 30, 2011, now Pat. No. 8,915,530.

(51) Int. Cl.
*B62D 21/02*    (2006.01)
*B62D 65/02*    (2006.01)
(Continued)

(52) U.S. Cl.
CPC ............... *B62D 65/02* (2013.01); *B62D 21/00* (2013.01); *Y10T 29/49616* (2015.01);
(Continued)

(58) Field of Classification Search
CPC ........ B62D 65/02; B62D 21/00; B62D 21/02; B62D 27/02; B62D 27/023; B62D 27/026; B62D 27/065
USPC ..................... 296/203.01, 205, 29; 29/897.2
See application file for complete search history.

(56) References Cited

U.S. PATENT DOCUMENTS 3,353,852 A    11/1967    Wood
3,943,616 A    3/1976    Smith et al.
(Continued)

FOREIGN PATENT DOCUMENTS

DE    19538803    4/1996
DE    19603956    8/1997
(Continued)

OTHER PUBLICATIONS

Hak-Sung Kim, Torque Transmission Characteristics of the Press Fit Joint Between the Aluminum Shaft and Steel Right with Small Teeth, Mechanics Based Design of Structures and Machines, Jan. 28, 2011, vol. 39, Issue 1, http://www.tandfonline.com/doi/abs/10.1080/15397734.2011.538655.

(Continued)

*Primary Examiner* — Jason S Morrow
*Assistant Examiner* — E Turner Hicks
(74) *Attorney, Agent, or Firm* — Raymond L. Coppiellie; Brooks Kushman P.C.

(57) ABSTRACT

A method of manufacturing a vehicle frame, includes: forming compatible threads on a first rail composed of a first material and a second rail composed of a second material; forming a pair of locators on the first and second rails, said locators configured to indicate an alignment condition of the first rail and second rail when screwed together; and screwing together the first rail and second rail.

18 Claims, 5 Drawing Sheets

(51) Int. Cl.
  *B62D 21/00*   (2006.01)
  *B23K 31/02*   (2006.01)
  *B23K 33/00*   (2006.01)
  *B62D 27/06*   (2006.01)
  *F16B 7/18*    (2006.01)
  *F16B 11/00*   (2006.01)
  *F16B 39/04*   (2006.01)

(52) U.S. Cl.
  CPC ............ *B23K 31/02* (2013.01); *B23K 33/006* (2013.01); *B23K 33/008* (2013.01); *B62D 21/02* (2013.01); *B23K 2201/006* (2013.01); *B23K 2201/185* (2013.01); *B23K 2201/28* (2013.01); *B23K 2203/08* (2013.01); *B23K 2203/18* (2013.01); *B23K 2203/20* (2013.01); *B62D 27/065* (2013.01); *F16B 7/182* (2013.01); *F16B 11/006* (2013.01); *F16B 39/04* (2013.01)

(56) References Cited

U.S. PATENT DOCUMENTS

| | | | |
|---|---|---|---|
| 4,131,980 A | 1/1979 | Zinnbauer | |
| 4,471,519 A | 9/1984 | Capello et al. | |
| 4,858,958 A * | 8/1989 | Harbeke | 285/31 |
| 5,427,198 A | 6/1995 | Walsh | |
| 5,470,416 A | 11/1995 | Herring, Jr. et al. | |
| 5,865,362 A | 2/1999 | Behrmann et al. | |
| 5,996,813 A | 12/1999 | Hendrix et al. | |
| 6,000,118 A | 12/1999 | Biernat et al. | |
| 6,053,567 A * | 4/2000 | Ito | 296/203.01 |
| 6,148,581 A * | 11/2000 | Separautzki | 52/653.2 |
| 6,299,210 B1 | 10/2001 | Ruehl et al. | |
| 6,696,147 B1 | 2/2004 | Herring, Jr. et al. | |
| 6,701,598 B2 | 3/2004 | Chen et al. | |
| 6,869,136 B2 * | 3/2005 | Igarashi et al. | 296/204 |
| 6,922,882 B2 | 8/2005 | Shah et al. | |
| 7,127,816 B2 | 10/2006 | Kiehl | |
| 7,144,040 B2 | 12/2006 | Kiehl et al. | |
| 7,267,736 B2 | 9/2007 | Hou et al. | |
| 7,517,425 B2 | 4/2009 | Schroeder et al. | |
| 7,654,571 B2 | 2/2010 | Gabbianelli et al. | |
| 8,146,930 B2 | 4/2012 | Sicilia et al. | |
| 8,528,803 B2 | 9/2013 | Ohashi et al. | |
| 2002/0170766 A1 | 11/2002 | Gantz et al. | |
| 2003/0102668 A1 * | 6/2003 | Tarbutton et al. | 285/328 |
| 2005/0133483 A1 | 6/2005 | Hou et al. | |
| 2005/0263568 A1 * | 12/2005 | Stol | 228/107 |
| 2006/0032895 A1 | 2/2006 | Durand et al. | |
| 2007/0281523 A1 * | 12/2007 | Riley | 439/157 |
| 2008/0296433 A1 | 12/2008 | Brenner et al. | |
| 2009/0188206 A1 | 7/2009 | Stol et al. | |
| 2010/0289300 A1 | 11/2010 | Kokubo | |
| 2011/0018248 A1 | 1/2011 | Cordea | |
| 2011/0158741 A1 * | 6/2011 | Knaebel | 403/265 |
| 2012/0068499 A1 | 3/2012 | Mildner et al. | |
| 2013/0026794 A1 | 1/2013 | Wagner et al. | |
| 2013/0229005 A1 | 9/2013 | Knittel et al. | |

FOREIGN PATENT DOCUMENTS

| | | |
|---|---|---|
| DE | 10311946 | 10/2003 |
| DE | 60111777 | 2/2006 |
| DE | 102004044017 | 3/2006 |
| DE | 10329017 | 12/2008 |
| DE | 102010045586 | 3/2012 |
| EP | 1506908 A3 | 8/2004 |
| EP | 1854704 A1 | 5/2007 |
| JP | 2007222877 | 9/2007 |
| WO | WO9639322 A1 | 6/1996 |
| WO | 9839174 | 11/1998 |
| WO | 0247959 | 6/2002 |
| WO | WO2009094090 | 7/2009 |

OTHER PUBLICATIONS

Office Action mailed Dec. 3, 2014 for U.S. Appl. No. 13/545,584, filed Jul. 1, 2012.

* cited by examiner

VEHICLE FRAME ASSEMBLIES WITH THREADED CONNECTIONS

CROSS-REFERENCE TO RELATED APPLICATIONS

This application is a continuation-in-part and claims the benefit of U.S. patent application Ser. No. 13/221,142 titled "Vehicle Support Frames with Interlocking Features for Joining Members of Dissimilar Materials" filed Aug. 30, 2011, now U.S. Pat. No. 8,915,530, which is hereby incorporated by reference in its entirety.

TECHNICAL FIELD

The present disclosure relates to methods of manufacturing vehicle frame assemblies, particularly those frame assemblies incorporating threaded connections.

BACKGROUND

Conventional vehicle support frames can be composed of different materials including, for example, steel, aluminum and reinforced polymer composites. Vehicle manufacturers attempt to strike a balance between weight reduction and structural rigidity. It is desirable to design lightweight vehicle frames for full-sized trucks. Aluminum structural members can be designed to achieve up to a 50% weight reduction while still meeting performance targets. Joining aluminum members to steel frame rails presents challenges.

For example, MIG welding aluminum cross members to steel rails is a challenging task as the weld-compatibility between most steels and aluminum is low. Welding, however, provides a cost-effective and robust manner of joining vehicle assembly structural members. Accordingly, it is desirable to consider manufacturing techniques that employ alternative joining techniques.

Past joining techniques have considered incorporating threaded connections between vehicle frame components. For example, in World Intellectual Property Organization Publication No. WO 96/39322 titled "Method for Joining Structural Components" screw attachments of two cross rails is discussed. Such threaded connections between structural components is, however, generally less desirable than welded connections.

Therefore, it still is desirable to have techniques for applying welds in vehicle frame assemblies that incorporate the use of threaded connections. Additionally, it is also desirable to improve upon existing threaded connection designs for vehicle structural members.

SUMMARY

The present disclosure addresses one or more of the above-mentioned issues. Other features and/or advantages will become apparent from the description which follows.

One advantage of the present disclosure is that it provides teachings on manufacturing vehicle frame assemblies using threaded connections with welded connections. Moreover, a locating system is provided to ensure proper alignment of components having compatible threads. Additionally, the use of adhesives and adhesive wells are discussed herein, thereby providing additional structural rigidity to vehicle components.

One exemplary embodiment of the present disclosure relates to a method of manufacturing a vehicle frame that includes: forming compatible threads on a first rail composed of a first material and a second rail composed of a second material; forming a pair of locators on the first and second rails, said locators configured to indicate an alignment condition of the first rail and second rail when screwed together; and screwing together the first rail and second rail.

Another exemplary embodiment of the present disclosure relates to a method of manufacturing a vehicle frame, including: forming compatible threads on an interconnecting member (ICM) and a first rail composed of a first material; screwing together the ICM and first rail; and welding the ICM to a second rail composed of a second material.

Another exemplary embodiment of the present disclosure relates to a vehicle frame assembly, including: a first vehicle structural member composed of a first material; a second vehicle structural member composed of a second material; compatible threads on the first and second vehicle structural members; and locators on the first and second vehicle structural members, said locators configured to indicate an alignment condition of the first and second vehicle structural members when screwed together.

Joining vehicle frame assembly rails composed of dissimilar materials using welding and adhesives will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Referring to the drawings, wherein like characters represent examples of the same or corresponding parts throughout the several views, there are shown various vehicle frame assemblies for use in motor vehicle chassis. Frame assemblies include structural components interconnected through threaded connections. In the illustrated examples, the threaded connections are coupled or mixed with adhesive or welded connections. Locators are also included on components to assist with alignment of threaded components. Thus, improved vehicle frame structures and manufacturing techniques for the same are provided with the present disclosure.

The teachings herein are applicable to any type of frame, especially vehicle frames including frames for pickup trucks, vans, minivans, sports utility vehicles, sedans, coupes, commercial vehicles, and all utility vehicles.

Figure 1:
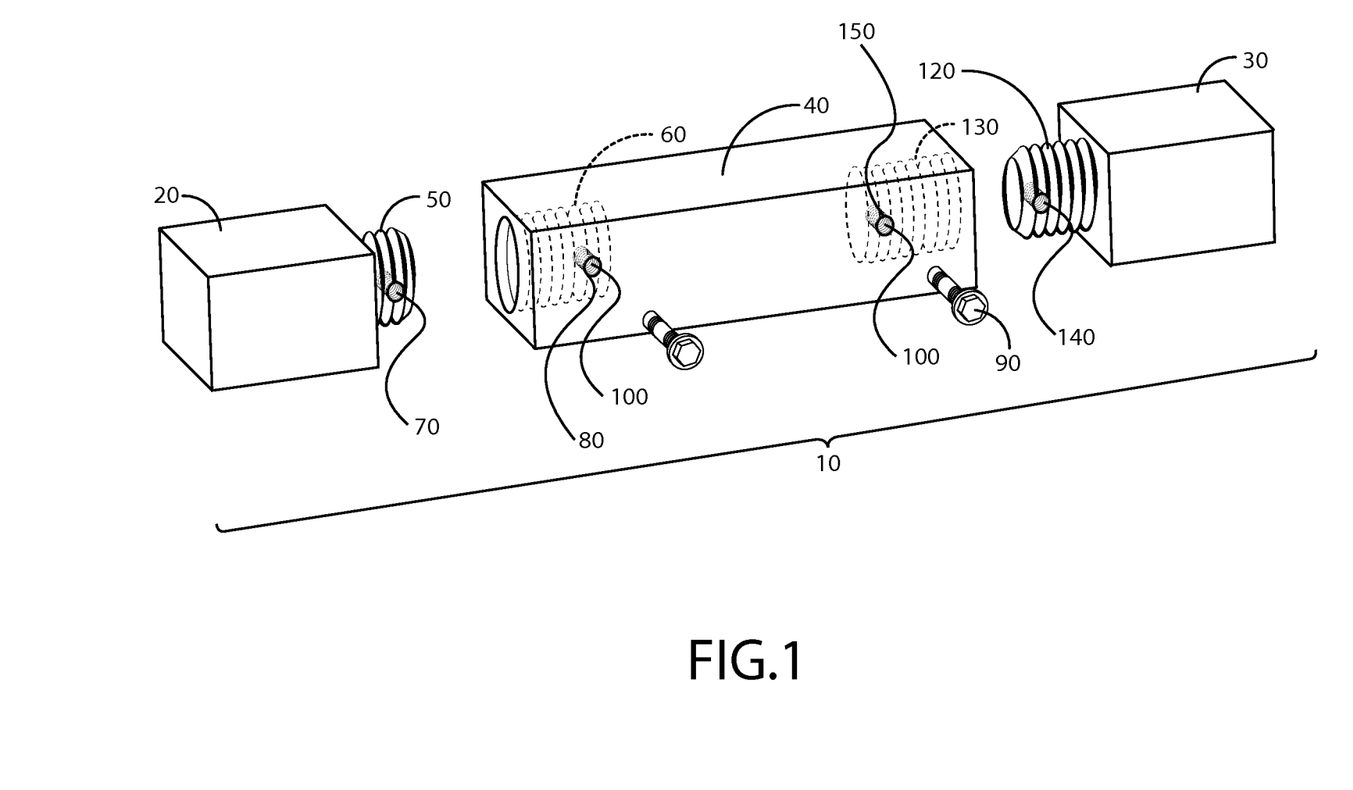
FIG. 1 is an exploded perspective view of an exemplary vehicle frame assembly, according to the present disclosure.
Figure 2:
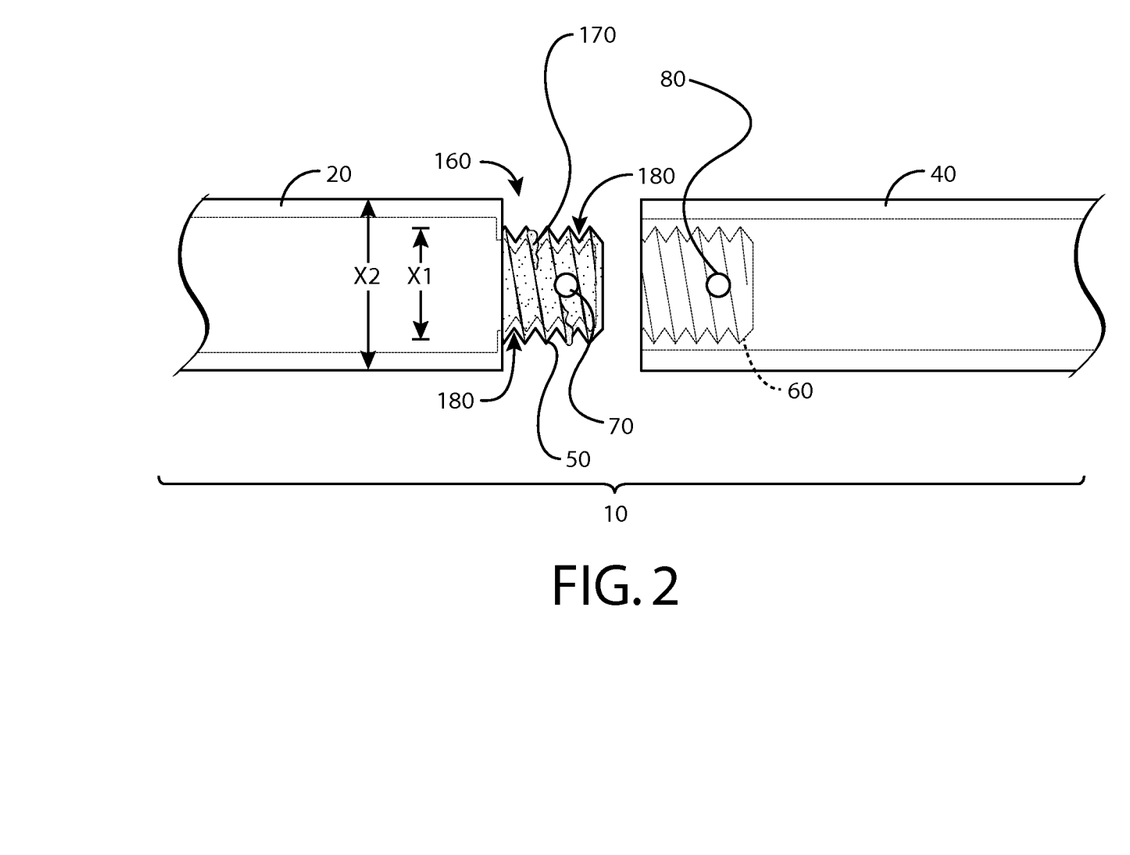
FIG. 2 is a side view of the vehicle frame assembly of FIG. 1.
Figure 3:
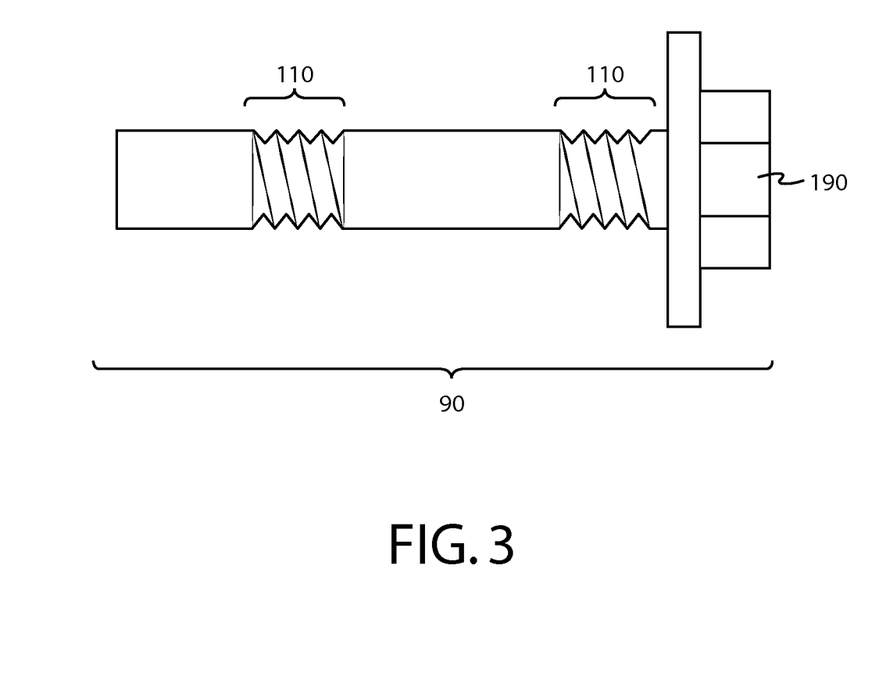
FIG. 3 is a side view of a bolt from the vehicle frame assembly of FIG. 1 at circle 3.

Referring now to FIGS. 1-3, there is shown an exemplary vehicle frame assembly 10 according to an embodiment the present disclosure. Vehicle frame assembly 10 is taken from a cross rail assembly for a vehicle, e.g., a spare tire frame. As shown in FIG. 1, assembly 10 includes two vehicle structural components 20, 30 configured to screw into another vehicle structural component 40, specifically a cross rail. Vehicle structural components 20, 30 can be intermediate/interconnecting members between the cross rail 40 and another structural component (e.g., a side rail) or vehicle structural components can be an extension of rail 40. In the illustrated embodiment, components 20, 30 are a continuation of rail 40. Components 20 and 30 are composed of steel. Cross rail 40 is composed of aluminum in this embodiment. Other material selections and combinations will be appreciated including non-metals and composites.

Components 20, 30 are shown disconnected from cross rail 40, in FIG. 1. Component 20 includes a threaded key 50. Cross rail 40 includes a receptor 60 that is threaded with compatible threads to key threads. Both components include an orifice 70, 80 on the component 20 and cross rail 40, respectively that acts as an alignment locator. When key 50 of component 20 is fully inserted into receptor 60 of cross rail 40 orifices 70 and 80 align. In another process a bolt 90 is inserted into each orifice 70, 80 to ensure that the alignment stays. Orifices 70, 80 are threaded with compatible threads 100 to the threads 110 on bolt, such as 90.

In the illustrated embodiment components 20, 30 and 40 are shown as rectangular rails. Other vehicle structural components and/or rail configurations can be used, such as cylindrical rails or, as previously stated, interconnecting members.

At an opposing end of cross rail 40 another threaded component 30 is attachable to the rail via threads, as shown in FIG. 1. Component 30 includes a threaded key 120. Cross rail 40 includes another receptor 130 that is threaded with compatible threads to key 120. Both components include an orifice 140 on component 30 and orifice 150 on cross rail 40, respectively that acts as an alignment locator. When key 120 of component 30 is fully inserted into receptor 130 of cross rail 40 orifices align. In another process, a bolt 90 is inserted into each orifice 140, 150. Orifices 140, 150 are threaded with compatible threads (e.g., 100) to the threads 110 on bolt 90, as shown in FIG. 3. Orifices 140, 150 are anti-rotation features—or locators—that can be applied for part handling or field usage.

Threads in the receptors 60 and 130 on end of cross rail 40 can be the same or different size. Thread size can be altered to be larger or smaller than the threads illustrated herewith. Threads provide additional resistance preventing relative movement between the components 20, 30 and cross rail 40.

To assemble cross rail 40 with components 20, 30 members are joined together by turning an end of component 20 or 30 and moving through the threads. The key 50 or 120 of components 20, 30 can be configured with a feature that enables turning, such as a textured surface for added grip, so that keys can be turned by manually. In another embodiment, a tool is designed to fit inside components 20, 30 to turn components into solid connection with cross rail 40.

As illustrated in FIG. 2, one cross-sectional area of component 20, x1, is smaller than another cross-sectional area of component, x2. The change in cross-sectional area forms a stop 160 on an outer surface of component 20. Mechanical stop 160 is configured to distribute a clamp load on the component 20 to the outer surface of cross rail 40. Stop 160 can be larger or smaller in other embodiments. In another embodiment, a stop is also formed on the internal surface of cross rail.

Component 20 key 50 is covered with an adhesive material 170, as shown in the side view of the vehicle frame assembly of FIG. 2. Adhesive 170 is distributed on an outer surface of key 50. Adhesive 170 is also accumulated in wells 180 of the threads formed on key 50, as shown. The threads provide an area for structural adhesive to be applied. Adhesive 170 can be applied to one side or both sides of key 50 and cross rail receptor 60. The structural adhesive 170 is a primary source of bonding and threads are a secondary source of bonding in this embodiment. Roles can be reversed or equilaterally distributed in other arrangements.

Referring again to FIG. 3, there is shown therein a side view of the bolt 90 from the vehicle frame assembly 10 of FIG. 1. Bolt 90 is twice threaded on a shaft of the bolt 90. Threads 110 are formed to be compatible with threads 100 on locators 70, 80, 140, 150 of components 20, 30 and cross rail 40. Another orifice (not shown) is added internally to the keys 50, and 120 of components 20, 30 to intermesh with threads 110 on bolt. A hexagonal head 190 is also on bolt 90 for compatibility with a crescent wrench or other tool. Adhesive 170 is applied to bolt threads in another embodiment.

Figure 4:
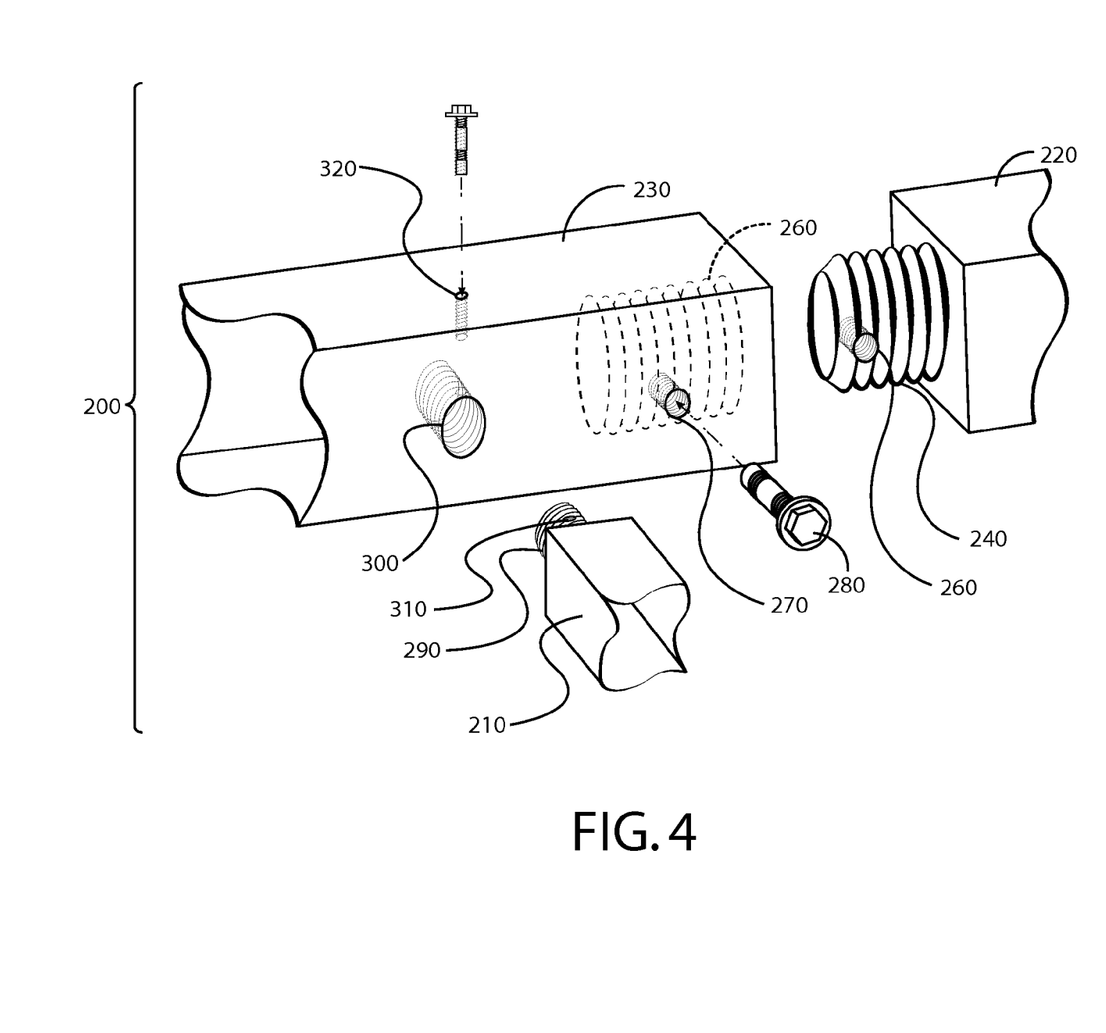
FIG. 4 is an exploded perspective view of another exemplary vehicle frame assembly, according to the present disclosure.

Now with reference to FIG. 4, there is shown an exploded perspective view of another exemplary vehicle frame assembly 200. Vehicle frame assembly 200 is taken from a cross rail assembly for a vehicle, e.g., a spare tire frame. As shown in FIG. 4, assembly 200 includes two vehicle structural components 210, 220 configured to screw into another vehicle structural component, specifically a side rail 230. Vehicle structural component 220 is an extension of side rail 230. Vehicle structural component 210 is an interconnecting member (or ICM) between a cross rail (such as cross rail 40 of FIG. 1) and another structural component (e.g., side rail 230). Side rail 230 is composed of steel. ICM 210 is composed of steel in this embodiment as well. Component 220 is composed of aluminum. Other material selections and combinations will be appreciated including non-metals and composites.

Components 210, 220 are shown disconnected from side rail 230 in FIG. 4. Component 220 includes a threaded key 240. Side rail 230 includes a receptor 250 that is threaded with compatible threads to key 240 threads. When key 240 of component 220 is fully inserted into receptor 250 of side rail 230 orifices 260, 270 align. In another process, a bolt 280 is inserted into each orifice 260, 270 to ensure that the alignment stays. Orifices 260, 270 are threaded with compatible threads to the threads on bolt 280.

In the illustrated embodiment components are shown as rectangular rails. Other vehicle structural components and/or rail configurations can be used, such as cylindrical rails or, as previously stated, interconnecting members.

Intersecting side rail 230 is another threaded component 210 attachable to side rail via threads, as shown in FIG. 4. ICM 210 includes a threaded key 290. Side rail 230 includes another receptor 300 that is threaded with compatible threads to key 290. Both components include an orifice 310, 320 that acts as an alignment locator. When key 290 of component is fully inserted into receptor 300 of side rail 230, orifices 310, 320 align. In another process, a bolt (such as 280) is inserted into each orifice 310, 320. Orifices 310, 320 are threaded with compatible threads to the threads on bolt. Orifices are anti-rotation features—or locators—that can be applied for part handling or field usage. Both component 220 and ICM 210 include an orifice 260 and 310, respectively that acts as an alignment locator.

Threads on side rail 230 can be of the same or different sizes. Thread size can be altered to be larger or smaller than the threads illustrated herewith. Threads provide additional resistance preventing relative movement between the components and cross rail.

To assemble cross rail with components, members are joined together by turning an end of components 210, 220 and moving through the threads. The keys 290, 240 of components 210, 220 can be configured with a feature that enable turning. In another embodiment, a tool is designed to fit inside components to turn components into solid connection with side rail 230. Component keys 240, 290 can be covered with an adhesive material in other embodiments.

Figure 5:
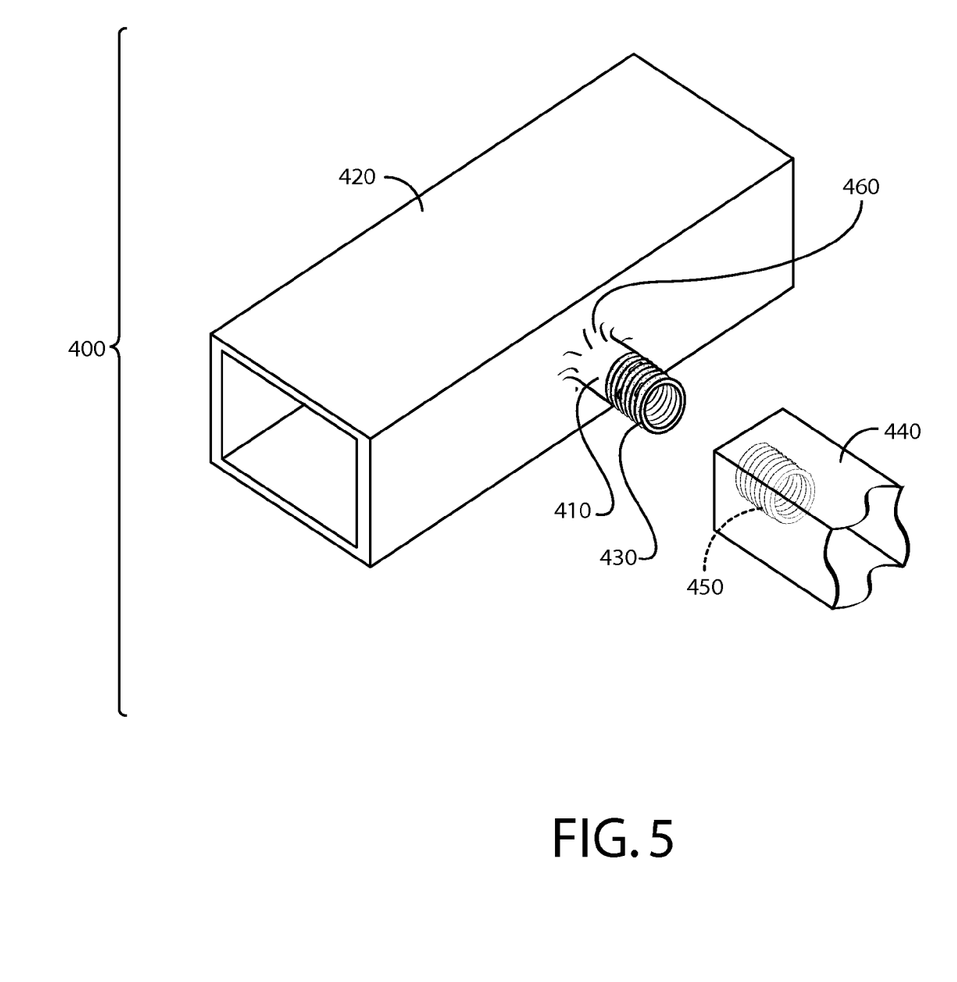
FIG. 5 is an exploded perspective view of another exemplary vehicle frame assembly, according to the present disclosure.

FIG. 5 is an exploded perspective view of another exemplary vehicle frame assembly 400. Vehicle frame assembly 400 includes an interconnecting member 410 welded to a side rail 420 for the vehicle frame at one end and formed with a threaded key 430 at another end. In this embodiment, side rail 420 and ICM 410 are composed of steel. A cross rail 440 is configured with a receptor 450 that is compatible with threads on key 430. Cross rail 440 is composed of aluminum.

Vehicle frame assembly 400 is taken from a cross rail assembly for a vehicle frame assembly. As shown in FIG. 5, assembly 400 includes a vehicle structural component (e.g., ICM 410) configured to screw into another vehicle structural component, specifically a cross rail 440. In the illustrated embodiment, side rail 420 is composed of steel. ICM 410 is composed of steel in this embodiment as well and is welded onto side rail 420 at weld line 460. A cross rail 440 is composed of aluminum. Other material selections and combinations will be appreciated including non-metals and composites.

Threads can be the same or different. Thread size can be altered to be larger or smaller size than the threads illustrated herewith. Threads provide additional resistance preventing relative movement between the component 410 and cross rail 440.

Those familiar with the art to which this invention relates will recognize various alternative designs, combinations and embodiments for practicing the invention within the scope of the appended claims.

We claim:

1. A method of manufacturing a vehicle frame, comprising:
  forming compatible threads on an interconnecting member (ICM) and a first rail composed of a first material;
  screwing together the ICM and first rail; and
  welding the ICM to a second rail composed of a second material such that a long axis of the ICM intersects a long axis of the second rail.

2. The method of claim 1, further comprising:
  forming the ICM to be composed of a material that is weld-compatible with the second material.

3. The method of claim 1, wherein forming compatible threads on an interconnecting member (ICM) and a first rail includes forming a well-section in the threads configured to hold adhesive therein.

4. The method of claim 3, further comprising:
  adding adhesive between the ICM and first rail.

5. The method of claim 1, further comprising:
  forming a pair of locators on the ICM and first rail, said locators configured to indicate rotational alignment of the ICM and first rail when screwed together.

6. The method of claim 5, further comprising:
  forming a bolt;
  forming compatible threads on the bolt and the locators; and
  threading the bolt through locators.

7. The method of claim 1, further comprising:
  forming the first rail to have a first cross-sectional configuration in one section and a second cross-sectional configuration in a second section;
  wherein the first rail includes compatible threads in the second section.

8. The method of claim 7, further comprising:
  forming a mechanical stop on an outer surface of the first rail configured to distribute a clamp load on the second rail to an outer surface of the first rail.

9. A vehicle frame assembly, comprising:
  a first structural member composed of a first material;
  a second structural member composed of a second material;
  a third structural member welded to the second structural member with a third member long axis intersecting a second member long axis;
  compatible threads on the first and second vehicle structural members; and
  corresponding fastener holes on the first and second structural members configured to jointly receive a fastener.

10. The vehicle frame assembly of claim 9, further comprising:
  a well in the compatible threads of the first or second vehicle structural member, configured to hold adhesive therein.

11. The vehicle frame assembly of claim 10, further comprising:
  adhesive in the well of threads between the first and second vehicle structural members.

12. The vehicle frame assembly of claim 9, further comprising:
  a bolt threaded through the locators fastener holes.

13. The vehicle frame assembly of claim 9, further comprising:
  a mechanical stop formed on an outer surface of the first vehicle structural member, the stop configured to distribute a clamp load on the second vehicle structural member to the outer surface of the first vehicle structural member.

14. A vehicle frame assembly comprising:
  a first linear member formed of a first material, the first linear member having a first central axis and a first threaded portion with a first fastener hole extending through the first threaded portion;
  a second linear member formed of a second material, the second linear member having a second central axis, a second threaded portion with a second fastener hole extending through the second threaded portion, and a third threaded portion, the second threaded portion being engaged with the first threaded portion such that the first and second central axes are generally coaxial;
  a first bolt extending through the first and second fastener holes to restrain rotation of the first linear member relative to the second linear member; and
  a third linear member formed of the second material, the third linear member having a fourth threaded portion, the fourth threaded portion being engaged with the third threaded portion.

15. The vehicle frame assembly of claim 14, wherein the third linear member has a third central axis, the third central axis being generally coaxial with the first and second axes.

16. The vehicle frame assembly of claim 14, wherein the third linear member has a third central axis, the third central axis intersecting the first and second axes.

17. The vehicle frame assembly of claim 16, wherein the third linear member intersects the first and second axes at an angle of approximately 90°.

18. The vehicle frame assembly of claim 14, further comprising a third fastener hole extending through the third threaded portion, a fourth fastener hole extending through the fourth threaded portion, and a second bolt extending through the third and fourth fastener holes to restrain rotation of the third linear member relative to the second linear member.

\* \* \* \* \*